(12) United States Patent
Cho et al.

(10) Patent No.: US 6,773,852 B2
(45) Date of Patent: Aug. 10, 2004

(54) LITHIUM COMPOSITION OXIDE AS POSITIVE ACTIVE MATERIAL FOR LITHIUM SECONDARY BATTERIES

(75) Inventors: Jae-Phil Cho, Suwon (KR); Geun-Bae Kim, Suwon (KR); Yong-Chul Park, Chunan (KR); Sung-Soo Kim, Seoul (KR)

(73) Assignee: Samsung SDI Co., Ltd., Kyungki-Do (KR)

( * ) Notice: Subject to any disclaimer, the term of this patent is extended or adjusted under 35 U.S.C. 154(b) by 284 days.

(21) Appl. No.: 09/849,246

(22) Filed: May 7, 2001

(65) Prior Publication Data

US 2001/0028874 A1 Oct. 11, 2001

Related U.S. Application Data

(62) Division of application No. 09/179,963, filed on Oct. 28, 1998, now Pat. No. 6,241,959.

(30) Foreign Application Priority Data

Oct. 30, 1997 (KR) .............................................. 97-56444
Oct. 30, 1997 (KR) .............................................. 97-56445

(51) Int. Cl.⁷ .............................................. H01M 4/48
(52) U.S. Cl. .................................. 429/231.3; 429/223
(58) Field of Search .......................... 429/231.3, 223; 423/594

(56) References Cited

U.S. PATENT DOCUMENTS

| | | | |
|---|---|---|---|
| 5,478,674 A | 12/1995 | Miyasaka | |
| 5,498,403 A | 3/1996 | Shin | |
| 5,587,139 A | 12/1996 | Shin | |
| 5,626,635 A | 5/1997 | Yamaura et al. | |
| 5,635,313 A | 6/1997 | Abe | |
| 5,674,643 A | 10/1997 | Yano et al. | |
| 5,993,998 A | 11/1999 | Yasuda | |
| 6,013,390 A | 1/2000 | Kimiya et al. | |
| 6,040,090 A | 3/2000 | Sunagawa et al. | |
| 6,045,771 A * | 4/2000 | Matsubara et al. | 423/593 |

FOREIGN PATENT DOCUMENTS

| | | |
|---|---|---|
| JP | 7-37576 | 2/1995 |
| JP | Hei8-339806 | 12/1996 |

OTHER PUBLICATIONS

Chang et al., Solid State Ionics, vol. 112, issue:3–4, pp. 329–344, Oct. 1, 1998.*

* cited by examiner

*Primary Examiner*—Carol Chaney
(74) *Attorney, Agent, or Firm*—Lowe Hauptman Gilman & Berner, LLP (57) ABSTRACT

A lithium composite oxide ($Li_aNi_{(1-x-y)}Co_xM_yO_2$, where M is at least one metal atom selected from the group consisting of Al, Ca, Mg and B, $a=0.97$~$1.05$, $x=0.1$~$0.3$, and $y=0$~$0.05$), prepared by a method including the steps of: (a) coprecipitating a Ni—Co composite hydroxide by adding an aqueous ammonia solution as a complexing agent, and an alkaline solution as a pH-adjusting agent, to an aqueous mixed solution containing a cobalt salt and a nickel salt; (b) adding lithium hydroxide to the composite hydroxide and thermally treating the mixture at 280~420° C.; and (c) thermally treating the resultant of the step (b) at 650~750° C. The average particle diameter of the lithium composite oxide decreases, or the tap density thereof increases, depending on the coprecipitation time. When the lithium composite oxide is used as a positive electrode active material, a lithium ion secondary cell having a high capacity can be obtained.

12 Claims, 12 Drawing Sheets

LITHIUM COMPOSITION OXIDE AS POSITIVE ACTIVE MATERIAL FOR LITHIUM SECONDARY BATTERIES

This is a division of application Ser. No. 09/179,963 filed Oct. 28, 1998 now U.S. Pat. No. 6,241,959.

BACKGROUND OF THE INVENTION

1. Field of the Invention

The present invention relates to a lithium (Li) secondary cell, and more particularly, to a lithium (Li) composite oxide, a preparation method thereof, and a Li ion secondary cell adopting the Li composite oxide as an active material of a positive electrode.

2. Description of the Related Art

As small, light, wireless electronic devices, such as camcoders, cellular phones and notebook computers, have been introduced into the market, a small, light secondary cell having high energy density has been required as a power source for these devices. In this aspect, a lithium secondary cell has been spotlighted.

Lithium can be used as a negative electrode material of a battery because its electronegativity is large and it has the largest electric capacity per unit weight due to its low molecular weight. However, lithium in the metal state tends to undergo dendrite crystal growth while being passivated by the reaction with an organic solvent, causing a short within the cell. Thus, there is a problem of stability of a cell. Thus, as a negative electrode material capable of replacing lithium metal, carbonaceous material, which has the most similar electric potential to lithium, and allows a reversible intercalation/deintercalation of the lithium ions due to its layered structure, has been developed.

Electrode reaction in the lithium secondary cell constituted of a carbonaceous negative electrode, a metal oxide positive electrode and a liquid electrolyte is as follows.

During the charging period, lithium ions of the positive electrode are deintercalated, and the lithium ions of the electrolyte solution are intercalated into the layered structure of the carbonaceous material, so that the concentration of lithium ions within the electrolyte solution is constantly maintained. During the discharging period, intercalation/deintercalation of the lithium ions is performed in the reverse direction to the charging period. The cell is called a "rocking chair" battery because the lithium ions reciprocate between two electrodes during the charging/discharging periods. Also, lithium exists as ions, without participation of the lithium metal itself, thus the cell is called a "lithium ion cell"

In the above lithium ion secondary cell, the Li metal oxide is used as the positive electrode material. Particularly, $LiCoO_2$, $LuMn_2O_4$, $LiNiO_2$, etc. have been used as the positive electrode material. Even though a lithium oxide containing cobalt has been commercialized, cobalt is deleterious and expensive. On the contrary, the lithium oxide containing nickel provides a high capacity and less deleteriousness at low costs. However, it is difficult to synthesize lithium oxide in a power form, and the lift span is not so good. To solve the above problems, a lithium composite oxide expressed by $LiMM'O_x$ (here, M and M' are transition metals, independently selected from cobalt (Co), manganese (Mn), nickel (Ni), vanadium (V), iron (Fe) and tungsten (W). Particularly, Ni of $LiNiO_2$ is partially substituted with another metal, so that the synthesis becomes easy and the life span is improved. Generally, such improvement is achieved by the crystalline structure or the particle shape of the lithium oxide. For example, in the case where the particle shape of the positive electrode active material is irregular in shape and small (approximately 5 $\mu$m of average diameter), a cell having high capacity can be obtained due to the smooth intercalation/deintercalcation of the lithium ions. Also, when the particle shape of the positive electrode active material is close to a spherical shape, which is advantageous to increase tap density, thus the relative weight ratio of the positive electrode active material can be increased in the preparation of the positive electrode active material.

Japanese Patent laid-open Publication No. Heisei 7-37576 discloses a method of preparing lithium oxide containing nickel. According to the disclosure, plate type monocrystalline particles (primary particles) of nickel hydroxide, educed by the neutralization reaction between a Ni salt solution and an alkaline solution, are agglomerated to form spherical or elliptic secondary particles. Then, the secondary particles of the nickel hydroxide and lithium compound, and magnesium compound if required, are thermally treated under an oxygen atmosphere, thereby forming a lithium compound containing nickel. In the case of the lithium oxide containing nickel, obtained by the above method, the flat type primary structure of the lithium oxide, where a plurality of flakes are stacked to form a layered structure, agglomerate to form the spherical or elliptical secondary structure having approximately 2~20 $\mu$m average diameter. That is, the secondary structure of the particles is obtained through the assembling process to agglomerate the primary particles having a layered structure. However, since the secondary particles are formed by agglomerating the primary particles through the assembly process, it is difficult to make the active material fine, and special attention is required to optimize the assembling conditions.

Japanese Patent laid-open Publication No. Heisei 8-339806 discloses a lithium composite oxide containing nickel represented by $LiNi_{(1-x)}M_xO_2$ (here, M is Co or Al, and x=0.05~0.3). According to this disclosure, an alkaline solution is added to a mixed aqueous solution containing cobalt salt and nickel salt to coprecipitate cobalt hydroxide and nickel hydroxide, resulting in a composite hydroxide. By agglomerating the monocrystalline particles of the composite hydroxide into a spherical or elliptic shape, a secondary structure of the particles is formed, and then lithium compound is added to the composite hydroxide and then thermally treated to form a lithium composite oxide containing cobalt in which the layered structure of the particle is exposed toward the outside of the spherical or elliptic secondary structure of the particles. According to this method, spherical particles having the secondary structure are formed at the point in time when the Ni and Co composite hydroxide is formed. Then, a lithium compound is added and then a thermal treatment is performed while the shape of the particle is maintained without changes. However, while the capacity is improved by the thermal treatment at approximately 750° C., it is difficult to maintain the shape of the particles as the treatment temperature increases. Also, because the layered structure of the particle is exposed toward the outside of the secondary structure of the particle, the tap density is not high.

SUMMARY OF THE INVENTION

To solve the above problems, it is an objective of the present invention to provide a simple method of preparing a lithium composite oxide without an assembling process.

It is another objective of the present invention to provide a lithium composite oxide prepared by the method.

It is still another objective of the present invention to provide a lithium secondary cell adopting the lithium composite oxide as an active material of a positive electrode.

Accordingly, to achieve the above first objective, there is provided a method of preparing a lithium composite oxide ($Li_aNi_{(1-x)}Co_xO_2$, where a=0.97~1.05 and x=0.1~0.3), comprising the steps of: (a) coprecipitating a Ni—Co composite hydroxide by adding an aqueous ammonia solution as a complexing agent, and an alkaline solution as a pH-adjusting agent, to an aqueous mixed solution containing a cobalt salt and a nickel salt; (b) adding lithium hydroxide to the composite hydroxide and thermally treating the mixture at 280~420° C.; and (c) thermally treating the resultant of the step (b) at 650~750° C.

Preferably, in the step (a), at least one metal salt selected from the group consisting of aluminum (Al), calcium (Ca), magnesium (Mg) and boron (B) is mixed at a mole ratio of 0.1:1 or less based on the total metal salt, before the complexing agent and the pH-adjusting agent are added to the acqueous mixed solution containing the Ni salt and Co salt.

Preferably, the coprecipitation of the step (a) is performed for 30~180 minutes such that a secondary particle having an irregular structure formed of acicular primary particles is formed.

Preferably, the coprecipitation reaction of step (a) is performed for 6~10 hours.

Preferably, both thermal treatment steps (b) and (c) are performed under a dry atmosphere.

To achieve the second objective, there is provided a lithium composite oxide ($Li_aNi_{(1-x-y)}Co_xM_yO_2$, where M is at least one metal atom selected from the group consisting of Al, Ca, Mg and B, a=0.97~1.05, x=0.1~0.3, and y=0~0.05) in which primary particles having a square structure are agglomerated to form a spherical secondary particle, and having a tap density of 2.4~3.2 $g/cm^3$.

Preferably, the primary particle has a triangle, square or pentagon shape, particularly, square shape, and an average particle diameter of 0.2~0.5 μm, and the secondary particle has an average particle diameter of 5~25 μm.

Preferably, the primary particle has an average particle diameter of 0.2~0.5 μm, and the secondary particle has an average particle diameter of 2~6 μm.

To achieve the third objective, there is provided a lithium ion secondary cell comprising a positive electrode containing a lithium oxide as an active material, a negative electrode containing a carbonaceous material and a non-aqueous electrolyte, wherein in the lithium oxide of the positive electrode, primary particles having a square structure are agglomerated to form a spherical secondary structure. Here, the lithium oxide of the positive electrode is a lithium composite oxide ($Li_aNi_{(1-x-y)}Co_xM_yO_2$ where M is at least one metal atom selected from the group consisting of Al, Ca, Mg and B, a=0.97~1.05, x=0.1~0.3, and y=0~0.05), having a tap density of 2.4~3.2 $g/cm^3$.

Also, there is provided a lithium composite oxide ($Li_a Ni_{(1-x-y)}Co_xM_yO_2$ where M is at least one metal atom selected from the group consisting of Al, Ca, Mg and B, a=0.97~1.05, x=0.1~0.3, and y=0~0.05) in which primary particles having a square structure are agglomerated to form an irregular secondary particle.

BRIEF DESCRIPTION OF THE DRAWINGS

The above objectives and advantages of the present invention will become more apparent by describing in detail preferred embodiments thereof with reference to the attached drawings in which.

DESCRIPTION OF THE PREFERRED EMBODIMENTS

Hereinafter, a method of preparing a lithium composite oxide according to the present invention will be described in detail to explain the principle of the present invention.

First, an aqueous ammonia solution and an alkaline solution are added to an aqueous mixed solution containing a cobalt salt and a nickel salt, and if required, a metal salt selected from the group consisting of aluminum (Al), magnesium (Mg), calcium (Ca) or boron (B). Here, the aqueous ammonia solution acts as a complexing agent, and controls the shape of the composite hydroxide, and the alkaline solution acts as a pH adjusting agent, and adjusts the pH of the mixed solution to the proper level for coprecipitation, preferably, 10.5~11.5. Here, the alkaline solution is not specifically limited provided that it exhibits such pH adjusting function.

When a coprecipitated product is extracted immediately after the coprecipitation is performed for 30~180 minutes, a Ni—Co composite hydroxide, or a Ni—Co-third metal composite hydroxide having an irregular shape (secondary particle) which is obtained from the agglomeration of fine acicular particles (primary particles) is obtained.

However, the coprecipitation process may be performed for a long time. That is, when the coprecipitated product is extracted at a predetermined time after the coprecipitation occurs, a spherical Ni—Co composite hydroxide, or Ni—Co-third metal composite hydroxide, agglomerated from the fine acicular particles, is formed. Here, the shape of the particles can be controlled according to the reaction time of the coprecipitation and the pH. In the present invention, while continuously monitoring the shape of the coprecipitated product after the coprecipitation occurs, the coprecipitated product is extracted at a time when the secondary particle structure forms a spherical shape. In the present invention, the coprecipitation process (reaction) is performed for 6~10 hours. If the coprecipitation time is less than 6 hours, the surfaces of the final lithium composite oxide particles are bumpy. Thus, it is difficult to obtain an intended range of the tap density. Also, if the coprecipitation reaction is performed for more than 10 hours, the particles forming the primary structure of the final lithium composite oxide agglomerate. Such agglomeration of the particles is favorable to improve the tap density, but lowers efficiency of intercalation/deintercalcation of the lithium ions.

Lithium hydroxide is added to the irregular or spherical composite hydroxide obtained by the agglomeration of the acicular particles, and then a first thermal treatment is performed at 280~420° C., resulting in an intermediate product in which the lithium hydroxide is partially dissolved at the surface of the Ni—Co composite oxide or Ni—Co-third metal composite oxide. Then, the intermediate product is slowly cooled to room temperature, a second thermal treatment is performed at 650~750° C., and then the temperature is again reduced to room temperature. The first and second thermal treatments are performed for 4~7 hours and 10~20 hours, respectively. The shape of the particles is preferably retained, within the above temperature range and reaction time.

In the present invention, the coprecipitation reaction time for forming the Ni—Co composite hydroxide is appropriately controlled, so that the shape of the final lithium composite oxide is easily controlled at the initial stage. That is, after forming the spherical composite hydroxide from the fine acicular particles having approximately 1 μm length or less and approximately 0.1 μm width or less through the coprecipitation reaction, the spherical composite hydroxide may be used as a starting material for lithium composite oxide. Otherwise, after forming the irregular composite hydroxide from the fine acicular particles, preferably having approximately 1 μm length or less and approximately 0.1 μm width or less, by extracting the Ni—Co composite hydroxide at the initial stage to prevent continuous growth, the formed irregular composite hydroxide may be used as a starting material. In each case, lithium composite oxide having a unique structure is obtained. Thus, the present invention is characterized in that the final product having the intended particle shape is obtained by controlling the shape of the particles of the starting material. In the present invention, the aqueous ammonia solution is used so as to control the particle shape of the starting compound. Thus, in the present invention, the particle shape of the composite hydroxide as the starting compound is easily controlled by controlling the coprecipitation reaction time using the aqueous ammonia solution as a complexing agent. Accordingly, the shape of the lithium composite oxide as the final product can be conveniently controlled.

A positive electrode adopting the above lithium composite oxide as the active material can be formed by any general method, without limitation. Also, a lithium ion secondary cell can be manufactured using the obtained positive electrode by any general method.

Hereinafter, the present invention will be described in detail through the following examples.

Preparation of Spherical Lithium Composite Oxide

EXAMPLE 1

Nitrates of nickel (Ni), cobalt (Co) and magnesium (Mg) were mixed in a mole ratio of 0.79:0.19:0.02 to prepare a solution (2.5 mol as a total metal). Then, aqueous ammonia solution (1 mol) was added and then coprecipitation reaction was performed while the pH of the solution was adjusted to approximately 11 using 6 mol NaOH. After 6 hours, a spherical Ni—Co composite hydroxide was separated. After mixing the obtained Ni—Co composite hydroxide with $LiOH \cdot H_2O$ at a 1:1 mole ratio, a first thermal treatment was performed to 400° C. at a heating rate of 2° C./minute under a dry atmosphere, resulting in an intermediate product in which LiOH is partially solubilized at the surface of the Ni—Co composite oxide. After the intermediate product was maintained at 400° C. for 6 hours, the intermediate product was cooled and photographed by a scanning electron microscope (see FIGS. 1A and 1B). Then, the obtained oxide was heated again to approximately 750° C. at a heating rate of 1° C./minute and then maintained at the same temperature for approximately 16 hours for sintering under a dry atmosphere. Then, the product was cooled to room temperature at a cooling rate of 1° C./minute and photographed by the SEM (see FIGS. 1C and 1D).

Figure 1A:
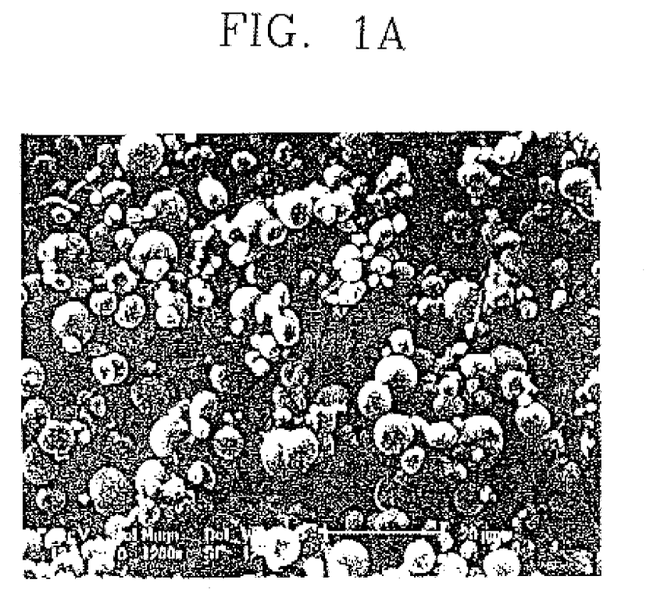
FIGS. 1A through 1D are photographs taken by a scanning electron microscope (SEM), showing the composite oxide and the surface of the particles, after the first thermal treatment (FIGS. 1A and 1B) and the second thermal treatment (FIGS. 1C and 1D) in the manufacturing process of a lithium composite oxide according to a first embodiment of the present invention.
Figure 1B:
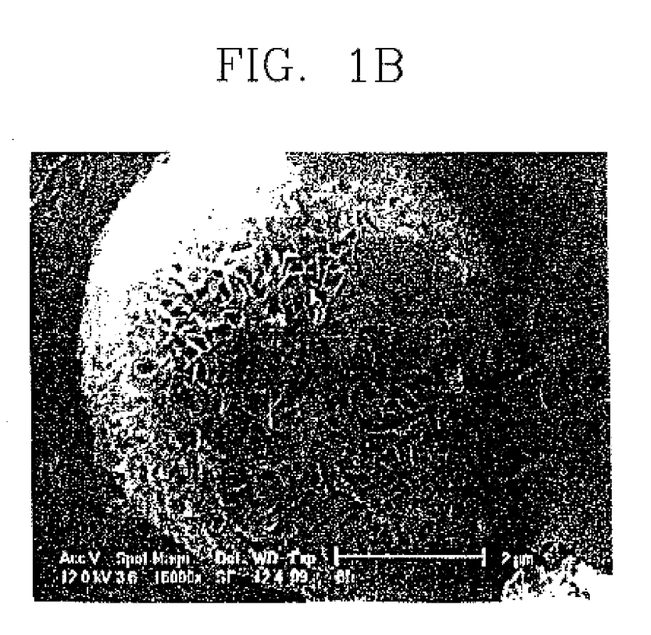

FIG. 1A is a SEM photograph of the Ni—Co composite oxide obtained after 6 hours of coprecipitation and the first thermal treatment. As shown in FIG. 1A, LiOH is nearly decomposed by the thermal treatment, and the decomposed lithium hydroxide is adhered to or solubilized in the surface of the Ni—Co composite oxide. FIG. 1B is a SEM photograph showing the surface state of the particles of FIG. 1A.

Figure 1C:
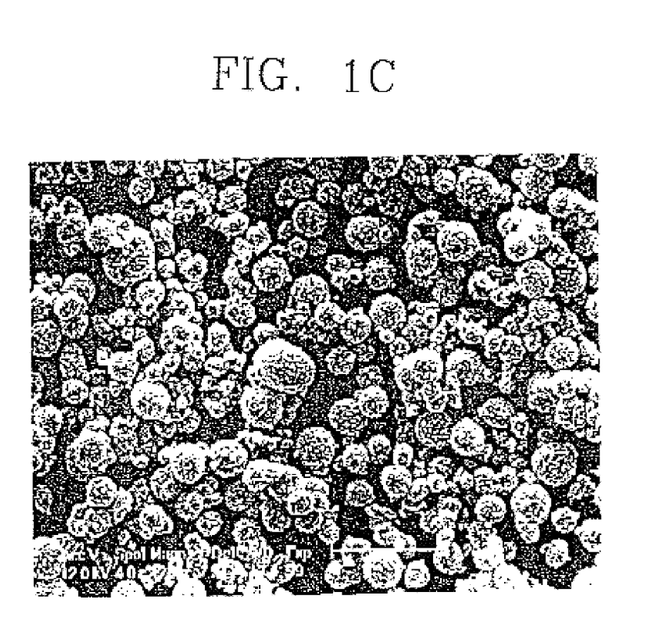
Figure 1D:
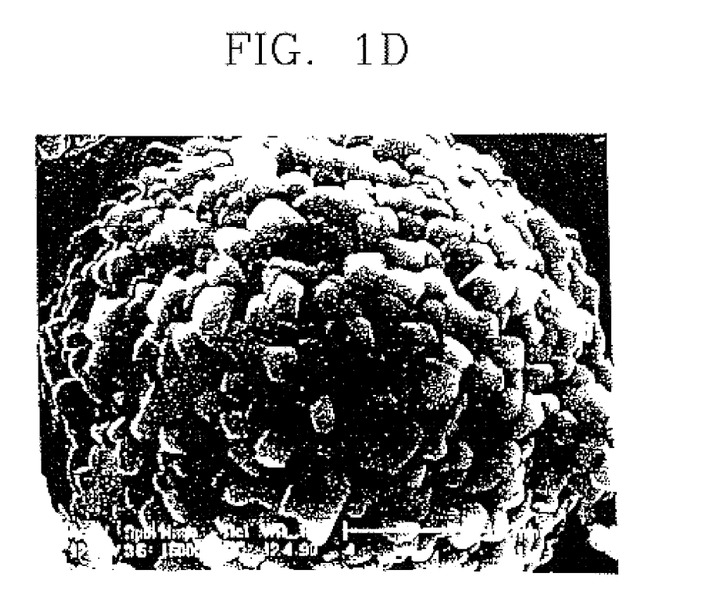

FIG. 1C is a SEM photograph of the final lithium composite oxide obtained after the second thermal treatment (sintering), and FIG. 1D is a SEM photograph showing the surface state of the particles of FIG. 1C. The average particle diameter after the sintering is nearly the same as the starting material. However, a small number of primary particles are changed into a square shape, and the square shapes of the particles slightly protrude toward the outside of the secondary structure of the particle.

The tap density of the lithium composite particles obtained after cooling the sintered particles was approximately 2.4 g/cm³.

Figure 2A:
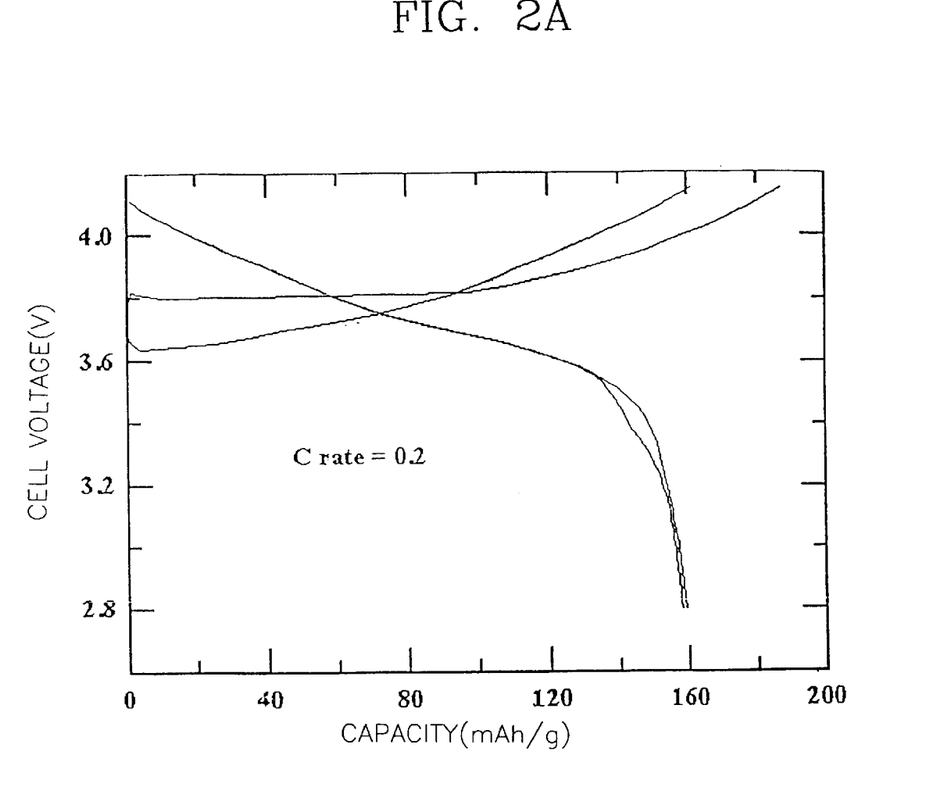
FIGS. 2A and 2B are graphs showing the result of a charging/discharging test on a cell adopting the lithium composite oxide obtained by the first embodiment as a positive electrode active material.
Figure 2B:
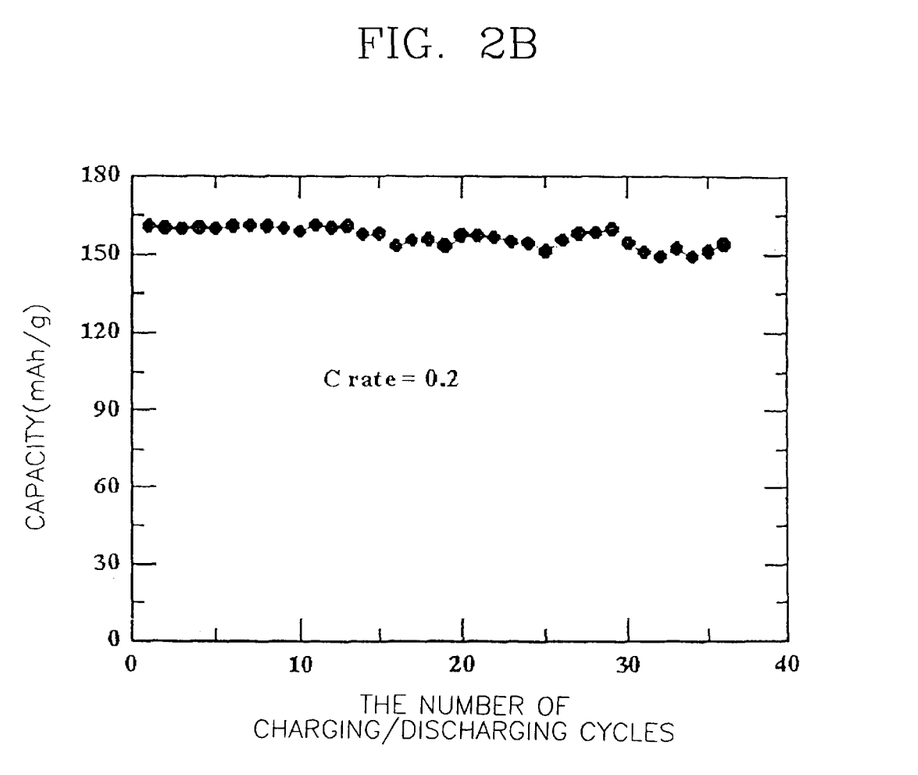

Then, a coin cell for a test was formed using the above powder by a general method, and then a charging/discharging test was performed at 0.2 C. The result is shown in FIGS. 2A and 2B. As can be seen from FIGS. 2A and 2B, the initial capacity was 160 mAh/g, and the capacity after 30 repetitions of the charging/discharging cycles was nearly the same as the initial capacity.

EXAMPLE 2

Lithium composite oxide was prepared by the same method as Example 1, except that the precipitation reaction was performed for 10 hours.

Figure 3A:
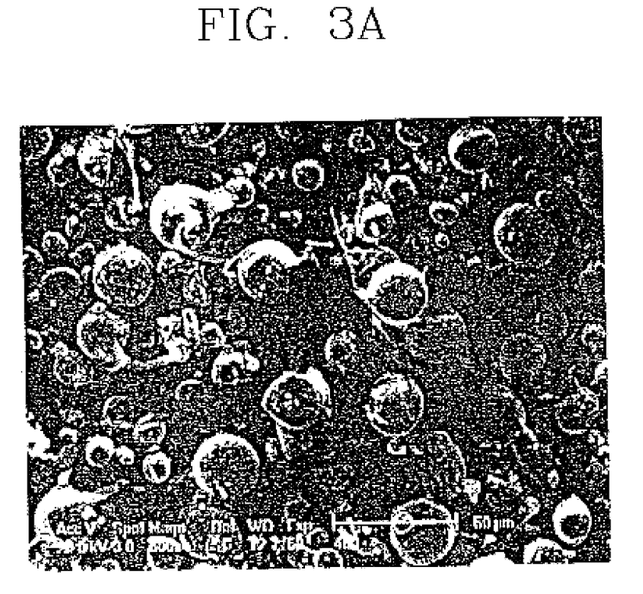
FIGS. 3A through 3D are photographs taken by the SEM, showing the composite oxide and the surface of the particles, after the first thermal treatment (FIGS. 3A and 3B) and the second thermal treatment (FIGS. 3C and 3D) in the manufacturing process of a lithium composite oxide according to a second embodiment of the present invention.
Figure 3B:
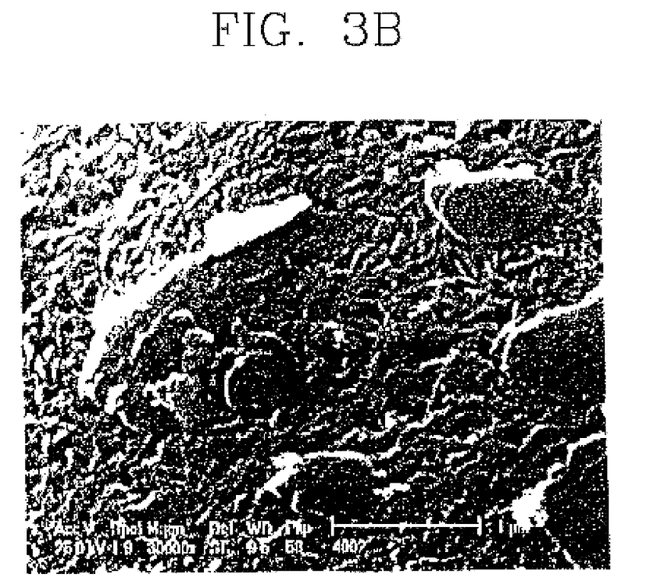

FIG. 3A is an SEM photograph of the Ni—Co composite oxide obtained after 10 hours of precipitation reaction and the first thermal treatment. As shown in FIG. 3A, lithium hydroxide was nearly decomposed by the thermal treatment and adhered to or solubilized in the surface of the Ni—Co composite oxide like in FIG. 1A. FIG. 3B is an SEM photograph showing the surface state of the particles of FIG. 3A. As shown by comparing FIGS. 3A and 1A, and 3B and 1B, the surfaces of the particles become denser and smoother in case that 10 hours of precipitation reaction was performed.

Figure 3C:
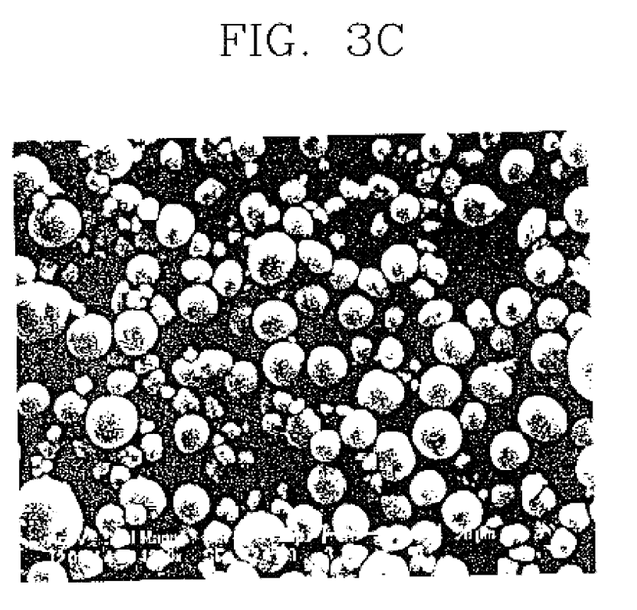
Figure 3D:
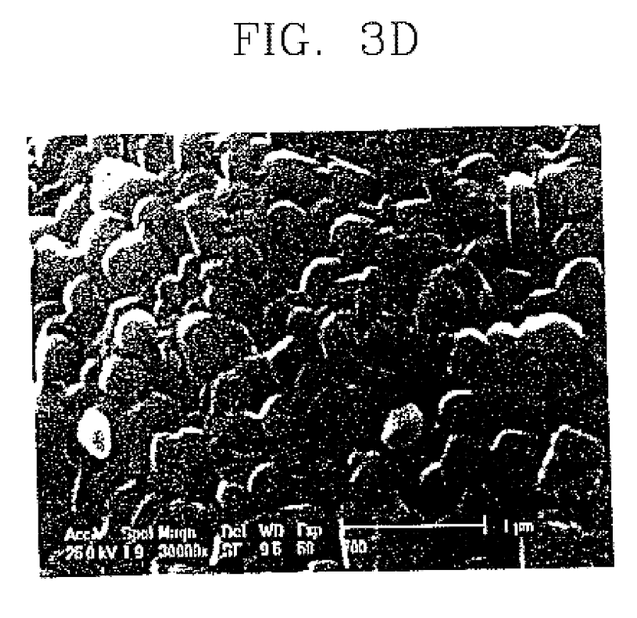

FIG. 3C is an SEM photograph of the final lithium composite oxide obtained after the second thermal treatment (sintering), and FIG. 3D is an SEM photograph showing the surface state of the particles of FIG. 1C. As shown by comparing FIGS. 3C and 1C, and 3D and 1D, the coprecipitation reaction time does not affect the particle size of the secondary structure of the final lithium composite oxide. However, the surfaces of the particles are smoother in case that 10 hours of coprecipitation reaction was performed.

The tap density of the lithium composite oxide powder obtained after the second thermal treatment was approximately 3.2 g/cm$^3$.

Generally, the higher the tap density, the smoother the surface state of the particles. Also, the higher tap density increases a relative packing amount of an active material for a positive electrode, thereby increasing capacity of a cell. Compared with the conventional lithium composite oxide having tap density of 2.4~2.7 g/cm$^3$, the present invention shows a significant improvement.

EXAMPLE 3

Figure 4A:
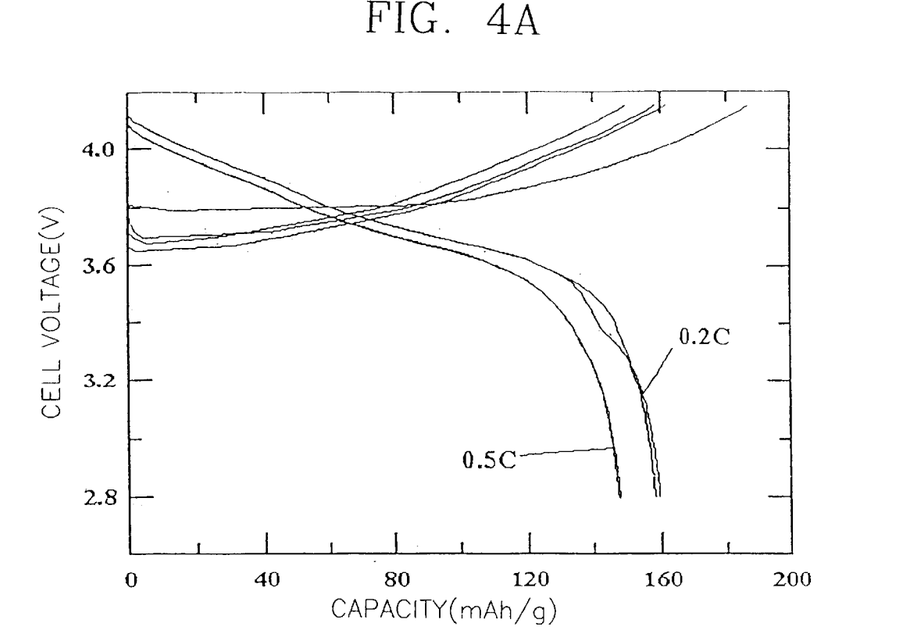
FIGS. 4A and 4B are graphs showing the result of a charging/discharging test on a cell adopting the lithium composite oxide obtained by the second embodiment as a positive electrode active material.
Figure 4B:
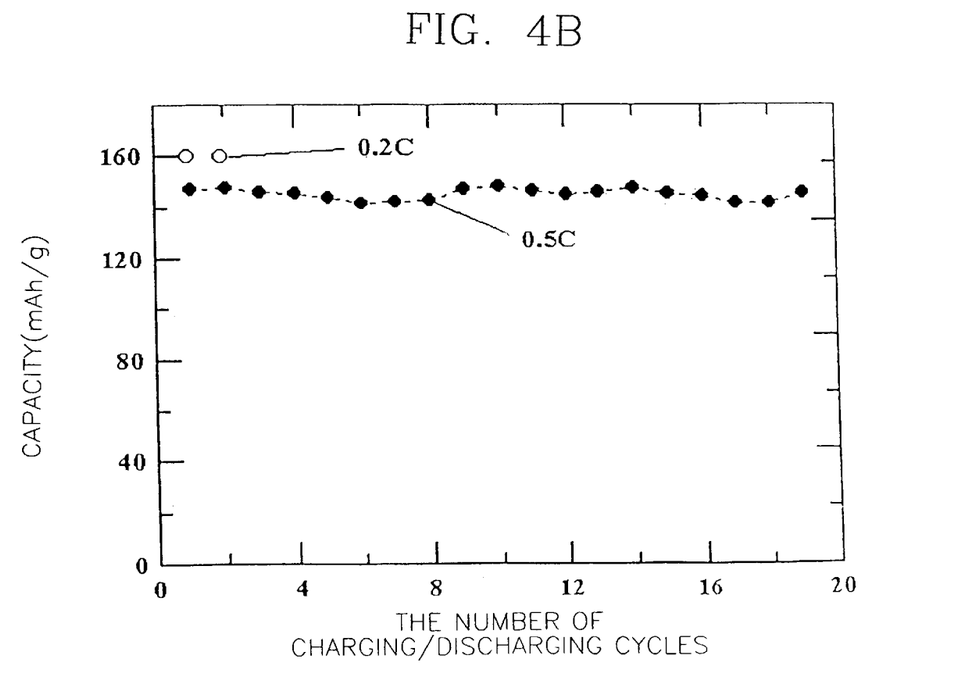

A coin cell was manufactured from a lithium composite oxide prepared by the same method as Example 2, except that only nickel salt and cobalt salt were mixed, in a mole ratio of 0.8:0.2, the first thermal treatment was performed by heating at 5° C./minute, holding for 8 hours at 350° C., and cooling at 3° C./minute to room temperature, and the second thermal treatment was performed by heating at 3° C./minute, holding for 16 hours at 750° C. and cooling at 2° C./minute to room temperature. Then, a charging/discharging test was performed on the obtained cell. After charging/discharging twice at 0.2 C, 20 repetitions of charging/discharging at 0.5 C were performed. The results are shown in FIGS. 4A and 4B. As seen from FIGS. 4A and 4B, the capacity scarcely decreases after the charging/discharging at 0.5 C.

When using the lithium composite oxide of this example as a positive electrode active material, packing density per volume can be increased due to the spherical shape of the active material. Also, the intercalating/deintercalating of the lithium ions is easily performed because the spherical particles are formed as the mass of the fine square particles.

Preparation of Irregular Lithium Composite Oxide

EXAMPLE 4

Nitrates of nickel (Ni), cobalt (Co) and magnesium (Mg) were mixed in a mole ratio of 0.79:0.19:0.02 to prepare a solution (2.5 mol as a total metal). Here, aqueous ammonia solution (1 mol) was added and then coprecipitation was performed while the pH of the metal solution was adjusted to approximately 11 using 6 mol NaOH. At the initial stage of the coprecipitation reaction, a Ni—Co composite hydroxide having an irregular secondary structure from the agglomeration of the acicular primary structure was separated, and then photographed by a SEM (see FIGS. 5A and 5B). After mixing the obtained Ni—Co composite hydroxide with LiOH.H$_2$O at a 1:1 mole ratio, a first thermal treatment was performed to 400° C. at a heating rate of 1° C./minute under a dry atmosphere, resulting in an intermediate product in which LiOH is partially dissolved at the surface of the Ni—Co composite oxide. After the intermediate product was maintained at 400° C. for 6 hours, the intermediate product was cooled and photographed by a scanning electron microscope (SEM) (see FIGS. 6A and 6B). Then, the obtained oxide was heated again to approximately 750° C. and then maintained at the same temperature for approximately 16 hours. Then, the product was cooled to room temperature and photographed by the SEM (see FIGS. 7A and 7B).

Figure 5A:
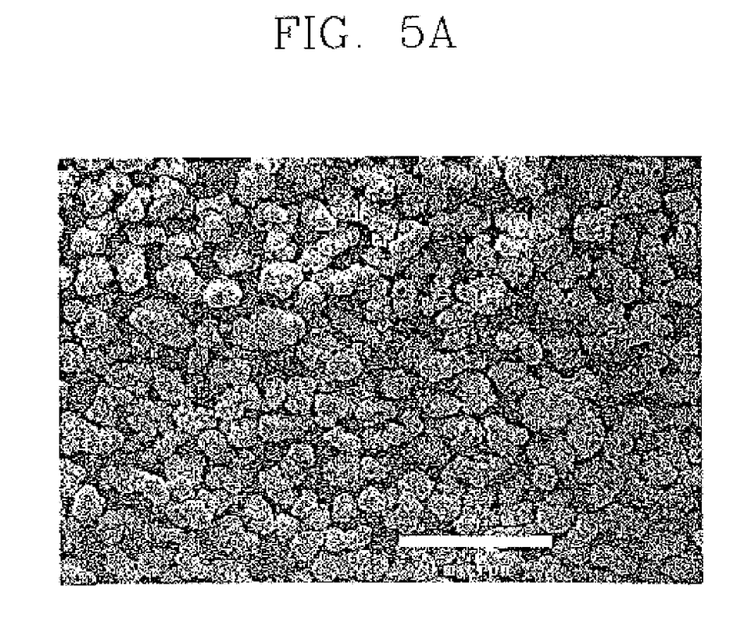
FIG. 5A is a photograph taken by the SEM, of a Ni—Co—Mg composite hydroxide, as a starting compound for preparing a Li composite oxide of a third embodiment of the present invention.
Figure 5B:
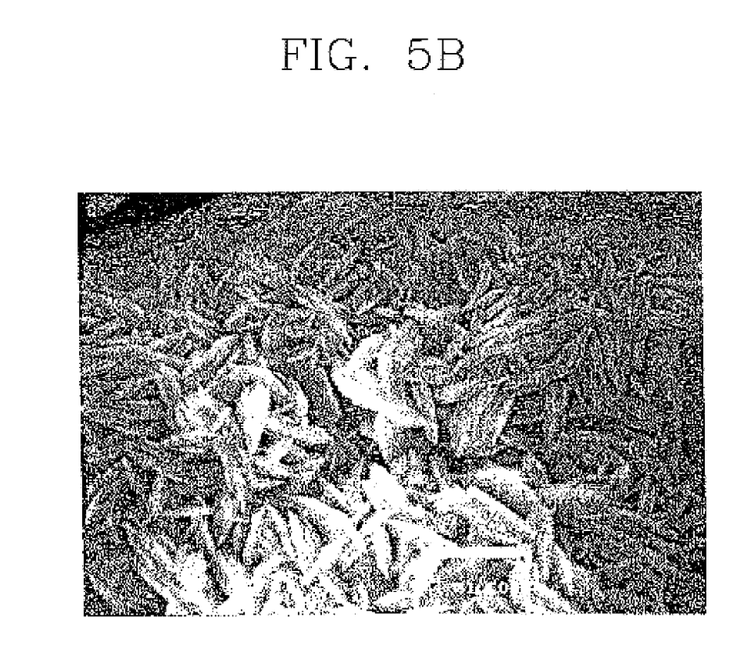
FIG. 5B is an enlargement of FIG. 5A.
Figure 6A:
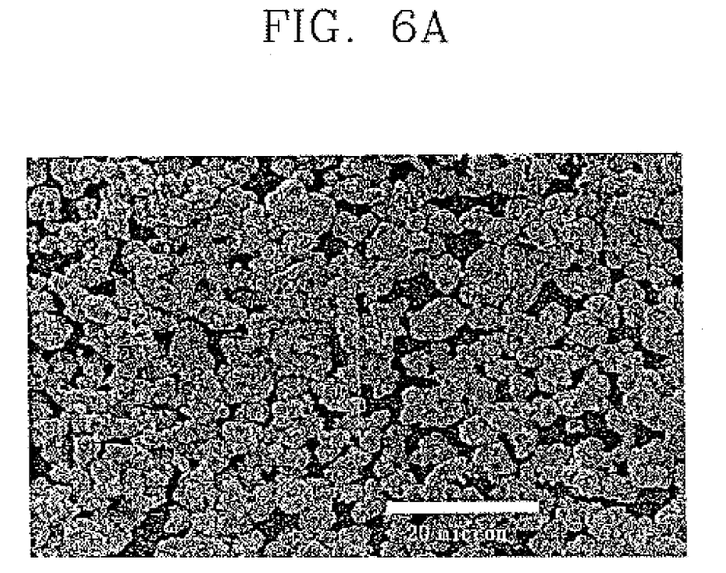
FIG. 6A is a photograph taken by the SEM, of the composite oxide after the first thermal treatment in the preparation process of the lithium composite oxide according to the third embodiment of the present invention.
Figure 6B:
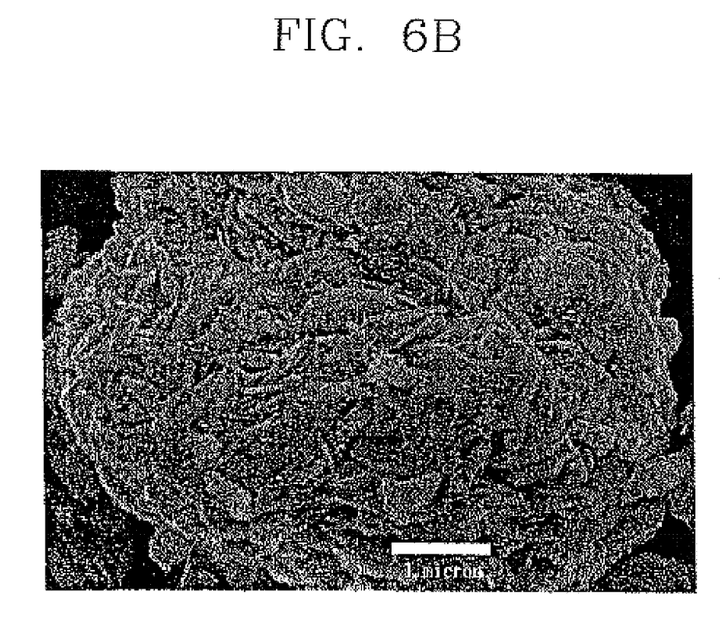
FIG. 6B is an enlargement of FIG. 6A.
Figure 7A:
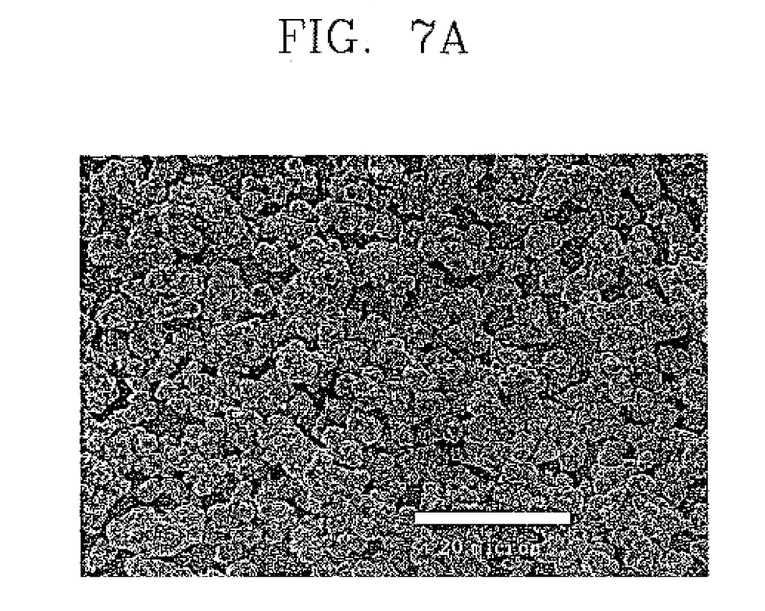
FIG. 7A is a photograph taken by the SEM, of the composite oxide after the second thermal treatment in the preparation process of the lithium composite oxide according to the third embodiment of the present invention.
Figure 7B:
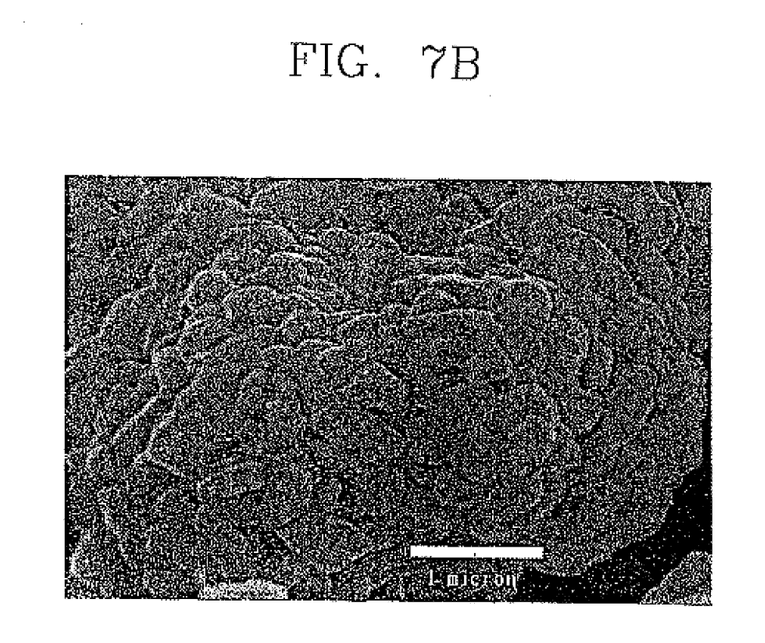
FIG. 7B is an enlargement of FIG. 7A.
Figure 8A:
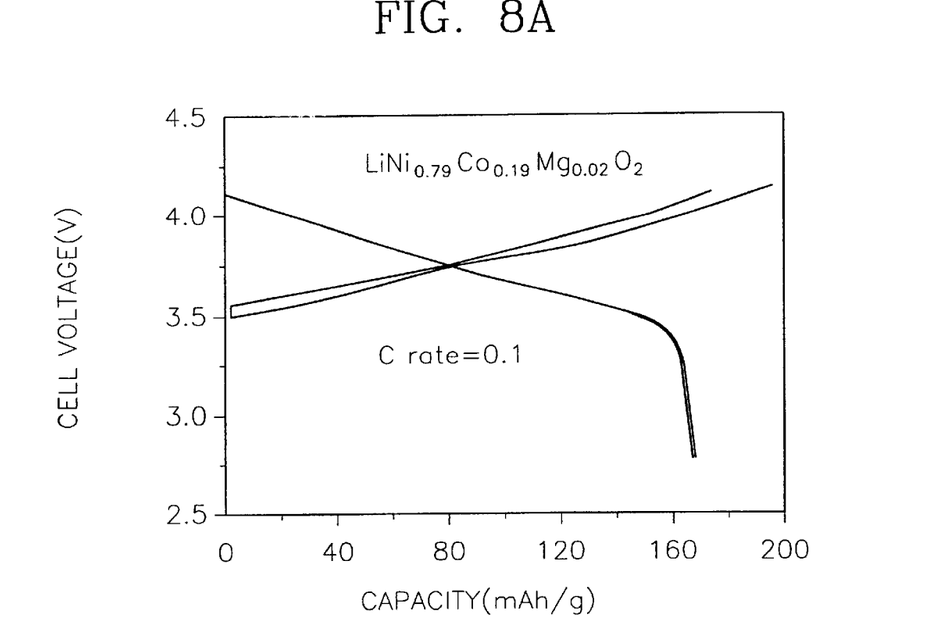
FIGS. 8A and 8B are graphs showing the result of a charging/discharging test on a cell adopting the lithium composite oxide obtained by the third embodiment as a positive electrode active material.
Figure 8B:
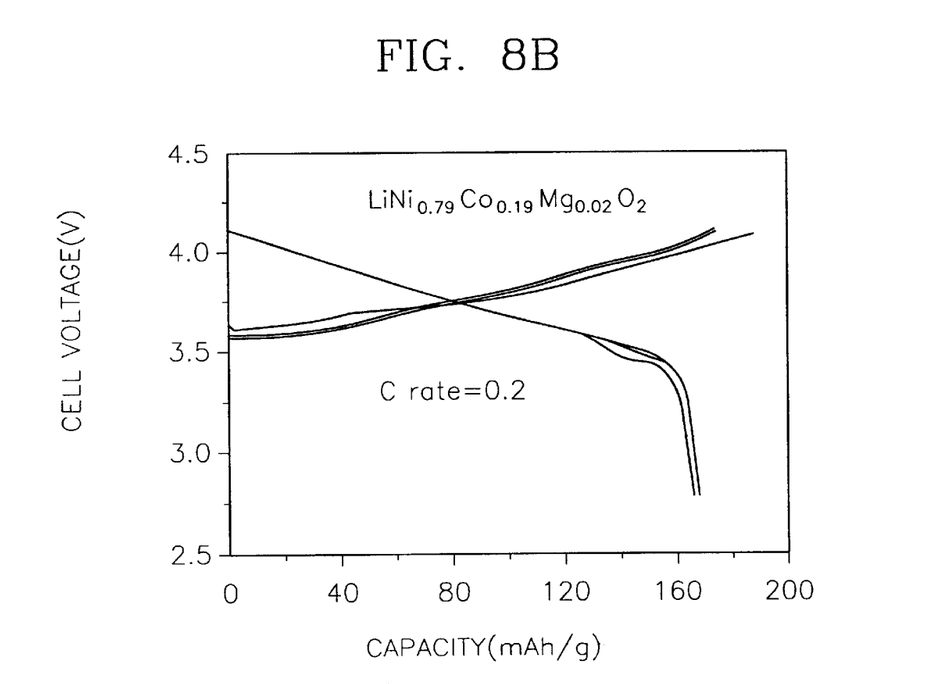

FIGS. 5A, 6A and 7A are SEM photographs showing the change in shape of the particles from the starting lithium composite hydroxide, and FIGS. 5B, 6B and 7B are enlarged views of FIGS. 5A, 6A and 7A, respectively.

FIGS. 5A and 5B show the Ni—Co—Mg composite hydroxide as the starting compound, where the irregular secondary structure of the particles by the agglomeration of the acicular primary structure, and many voids are shown. FIGS. 6A and 6B show the composite hydroxide after the first thermal treatment, where the average particle size of the primary and secondary structures is similar to the starting compound, and an intermediate product, in which LiOH, originated from the decomposition of water molecule from LiOH.H$_2$O, is dissolved in or permeated into the surface of the Ni—Co composite oxide, still maintaining the primary and secondary structure as in the starting compound. FIGS. 7A and 7B show the final lithium composite oxide after the second thermal treatment (sintering). After the sintering, the average particle size and shape are similar to the starting compound. However, it can be seen that the acicular primary particle structure of the starting compound is changed into a square shape during the sintering process.

That is, unlike the conventional case where the secondary structure is formed by artificially assembling the primary particles, the secondary particles are spontaneously formed from the acicular primary particles during the coprecipitation. That is, an extra assembling process is not necessary. Also, the size and shape of the secondary particles scarcely change during the sintering process, and only the primary structure of the particles changes from the acicular shape into the square shape, resulting in a fine powdered lithium composite oxide.

Using the lithium composite oxide powder obtained by cooling the product after the second thermal treatment, a coin cell for a test was manufactured by a general method. Then, a charging/discharging test was performed on the coin cell at 0.1 C and 0.2 C. The initial capacity at 0.1 C was 170 mAh/g and that at 0.2 C was 168 mAh/g.

EXAMPLE 5

Figure 9A:
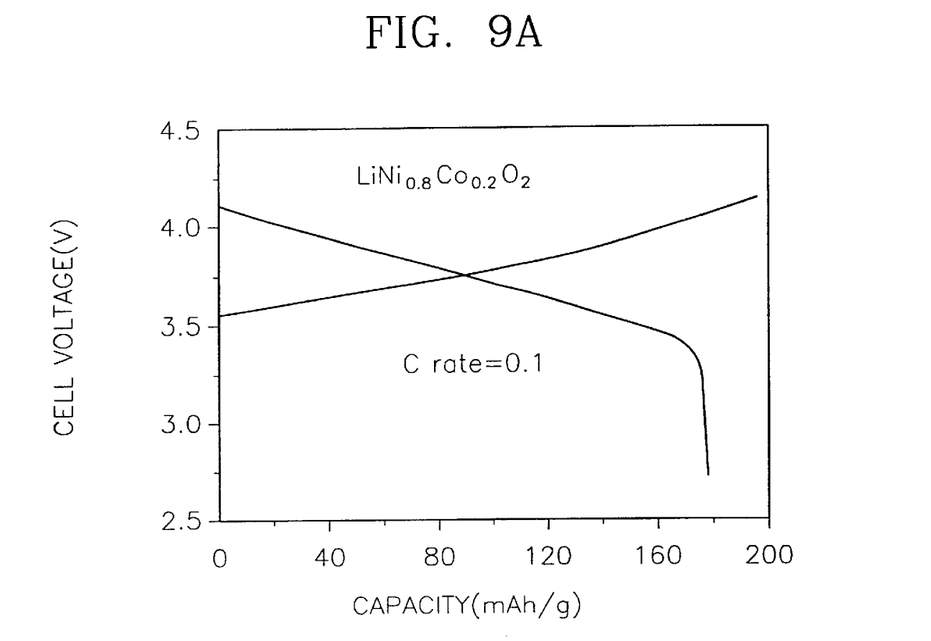
FIGS. 9A and 9B are graphs showing the result of a charging/discharging test on a cell adopting the lithium composite oxide obtained by the fourth embodiment as a positive electrode active material.
Figure 9B:
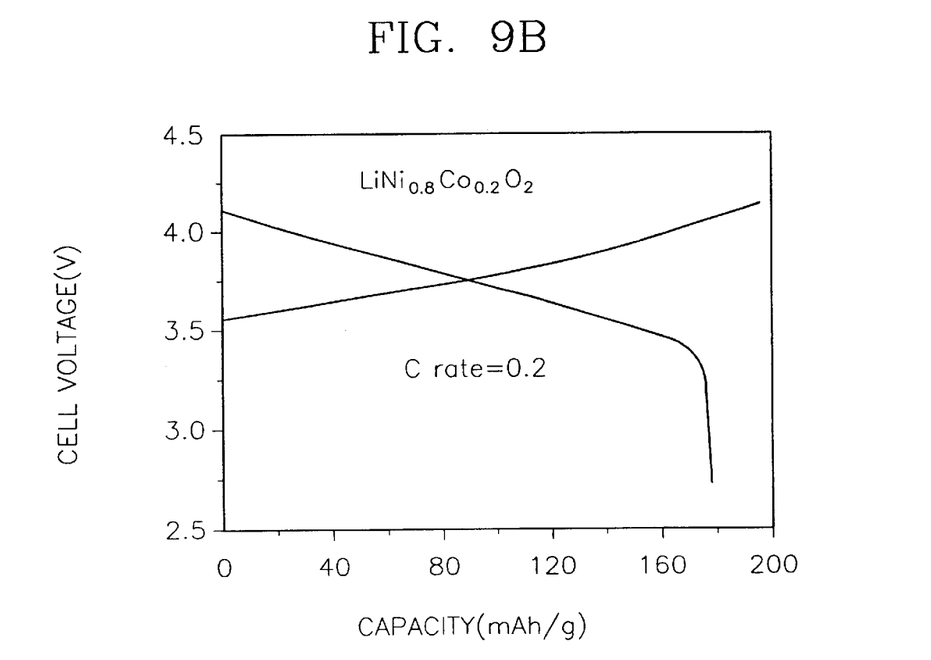

A coin cell was manufactured from a lithium composite oxide prepared by the same method as Example 4, except that only nickel salt and cobalt salt were mixed, at a mole ratio of 0.8:0.2, the first thermal treatment was performed by heating at 5° C./minute, holding for 8 hours at 400° C., and cooling at 4° C./minute to room temperature, and the second thermal treatment was performed by heating at 2° C./minute, holding for 8 hours at 750° C., and cooling at 1° C./minute to room temperature. Then, a charging/discharging test was performed on the obtained cell (2.8~4.1V). The initial capacity at 0.1 C was 180 mAh/g and that at 0.2 C was also approximately 180 mAh/g (see FIGS. 9A and 9B).

EXAMPLE 6

A coin cell was manufactured from a lithium composite oxide prepared by the same method as Example 4, except that nitrates of nickel, cobalt and magnesium were mixed at a mole ratio of 0.8:0.15:0.05. Then, a charging/discharging test was performed on the obtained cell. As a result, the initial capacity at 0.1 C was 154 mAh/g and that at 0.2 C was approximately 150 mAh/g.

When the lithium composite oxides prepared by Examples 4 through 6 are used as the positive electrode active material for a cell, the capacity of the cell is increased by 10% or more compared with the general active material having the average particle size of approximately 10~25 μm. Such increase in capacity is attributed to the structure of the lithium composite oxide, which allows easy intercalation/deintercalcation of the lithium ions, and to the decreased average particle size of the composite oxide.

As described above, the lithium composite oxide of the present invention has a structure which allows easy intercalation/deintercalcation of the lithium ions, and smaller average particle size, and a higher tap density. Thus, the lithium composite oxide of the present invention can increase capacity when used as a positive electrode active material for a cell.

What is claimed is:

1. A lithium secondary cell, comprising a positive electrode containing lithium oxide as an active material a negative electrode containing a carbonaceous material and a non-aqueous electrolyte, wherein the lithium oxide of the positive electrode is a lithium composite oxide expressed as $$Li_aNi_{(1-x-y)}Co_xM_yO_2$$

where M is at least one metal atom selected from the group consisting of Al, Ca, Mg and B,
  a=0.97~1.05,
  x=0.1~0.3, and
  0<y≦0.05;
  said lithium composite oxide including generally spherical secondary particles, and having a tap density of 2.4~3.2 g/cm³.

2. The lithium secondary cell of claim 1, wherein the secondary particles have an average particle diameter of 5~25 μm.

3. A lithium secondary cell, comprising a positive electrode containing lithium oxide as an active material, a negative electrode containing a carbonaceous material and a non-aqueous electrolyte, wherein the lithium oxide of the positive electrode is a lithium composite oxide expressed as $$Li_aNi_{(1-x-y)}Co_xM_yO_2$$

where M is at least one metal atom selected from the group consisting of Al, Ca, Mg and B,
  a=0.97~1.05,
  x=0.1~0.3, and
  0<y≦0.05;
  wherein said lithium composite oxide includes secondary particles of irregular shapes.

4. The lithium secondary cell of claim 3, wherein the secondary particles have an average particle diameter of 2~6 μm.

5. A lithium secondary cell, comprising a positive electrode containing lithium oxide as an active material, a negative electrode containing a carbonaceous material and a non-aqueous electrolyte, wherein the lithium oxide of the positive electrode is a lithium composite oxide expressed as $$Li_aNi_{(1-x-y)}Co_xM_yO_2$$

where M is at least one metal atom selected from the group consisting of Al, Ca, Mg and B,
  a=0.97~1.05,
  x=0.1~0.3, and
  0<y≦0.05;
  wherein said lithium composite oxide includes secondary particles of a generally spherical shape.

6. A lithium secondary cell, comprising a positive electrode containing lithium oxide as an active material, a negative electrode containing a carbonaceous material and a non-aqueous electrolyte, wherein the lithium oxide of the positive electrode is a lithium composite oxide expressed as $$Li_aNi_{(1-x-y)}Co_xM_yO_2$$

where M is at least one metal atom selected from the group consisting of Al, Ca, Mg and B,
  a=0.97~1.05,
  x=0.1~0.3, and
  0<y≦0.05;
  wherein said lithium composite oxide includes secondary particles having a tap density of 2.4~3.2 g/cm³.

7. Lithium oxide for use as an active material of a positive electrode in a lithium secondary cell, wherein said lithium oxide is a lithium composite oxide expressed as $$Li_aNi_{(1-x-y)}Co_xM_yO_2$$

where M is at least one metal atom selected from the group consisting of Al, Ca, Mg and B.
  a=0.97~1.05,
  x=0.1~0.3, and
  0<y≦0.05;
  wherein said lithium composite oxide includes secondary particles of irregular shapes.

8. The lithium oxide of claim 7, wherein the secondary particles have an average particle diameter of 2~6 μm.

9. Lithium oxide for use as an active material of a positive electrode in a lithium secondary cell, wherein said lithium oxide is a lithium composite oxide expressed as $$Li_aNi_{(1-x-y)}Co_xM_yO_2$$

where M is at least one metal atom selected from the group consisting of Al, Ca, Mg and B,
  a=0.97~1.05,
  x=0.1~0.3, and
  0<y≦0.05;
  wherein said lithium composite oxide includes secondary particles of a generally spherical shape.

10. The lithium oxide of claim 9, wherein the secondary particles have an average particle diameter of 5~25 μm.

11. The lithium oxide of claim 9, wherein said secondary particles have a tap density of 2.4~3.2 μg/cm³.

12. Lithium oxide for use as an active material of a positive electrode in a lithium secondary cell, wherein said lithium oxide is a lithium composite oxide expressed as $$Li_aNi_{(1-x-y)}Co_xM_yO_2$$

where M is at least one metal atom selected from the group consisting of Al, Ca, Mg and B,
  a=0.97~1.05,
  x=0.1~0.3, and
  0<y≦0.05;
  wherein said lithium composite oxide includes secondary particles having a tap density of 2.4~3.2 g/cm³.

* * * * *

UNITED STATES PATENT AND TRADEMARK OFFICE
CERTIFICATE OF CORRECTION

PATENT NO.        : 6,773,852 B2
APPLICATION NO.   : 09/849246
DATED             : August 10, 2004
INVENTOR(S)       : Jae-Phil Cho et al.

It is certified that error appears in the above-identified patent and that said Letters Patent is hereby corrected as shown below:

Specification

Column 1, line 18, please delete "camcoders" and replace with --camcorders--.

Column 1, line 60, please delete "power" and replace with --powder--.

Column 2, line 15, please delete "educed" and replace with --reduced--.

Column 3, line 20, please delete "acqueous" and replace with --aqueous--.

Column 6, line 64, please delete "precipitation" and replace with --coprecipitation--.

Column 6, line 67, please delete "precipitation" and replace with --coprecipitation--.

Column 7, line 8, please delete "precipitation" and replace with --coprecipitation--.

Claims

Column 9, line 29, please delete "$Li_aNi_{(1-x-y)}CO_xM_yO_2$" and replace with --$Li_aNi_{(1-x-y)}Co_xM_yO_2$--.

Column 9, line 47, please delete "$Li_aNi_{(1-x-y)}CO_xM_yO_2$" and replace with --$Li_aNi_{(1-x-y)}Co_xM_yO_2$--.

Column 9, line 65, please delete "$Li_aNi_{(1-x-y)}CO_xM_yO_2$" and replace with --$Li_aNi_{(1-x-y)}Co_xM_yO_2$--.

Column 10, line 12, please delete "$Li_aNi_{(1-x-y)}CO_xM_yO_2$" and replace with --$Li_aNi_{(1-x-y)}Co_xM_yO_2$--.

Column 10, line 26, please delete "$Li_aNi_{(1-x-y)}CO_xM_yO_2$" and replace with --$Li_aNi_{(1-x-y)}Co_xM_yO_2$--.

Signed and Sealed this

Twelfth Day of October, 2010

David J. Kappos
*Director of the United States Patent and Trademark Office*